United States Patent [19]

Avery, Jr.

[11] Patent Number: 5,069,358
[45] Date of Patent: Dec. 3, 1991

[54] MEDIA CASE

[75] Inventor: Roland M. Avery, Jr., Pittsford, N.Y.

[73] Assignee: John D. Brush & Co., Inc., Rochester, N.Y.

[21] Appl. No.: 637,294

[22] Filed: Jan. 3, 1991

[51] Int. Cl.$^5$ .......................... B65D 6/10; B65D 25/14
[52] U.S. Cl. ...................................... 220/426; 29/455.1; 29/469; 109/84; 206/387; 206/444; 220/468
[58] Field of Search ................. 29/455.1, 469; 109/65, 109/68, 80, 82-84; 206/387, 444, 307; 220/215, 426, 428, 444, 453, 468, 469; 312/214

[56] References Cited

U.S. PATENT DOCUMENTS

| | | |
|---|---|---|
| 1,038,428 | 9/1912 | Pederson .............................. 109/84 |
| 2,153,868 | 4/1939 | Hunter . |
| 2,492,422 | 12/1949 | Govan . |
| 3,559,594 | 2/1971 | Miller . |
| 3,709,169 | 1/1973 | Gauger, Jr. et al. . |
| 3,888,557 | 6/1975 | Anderson et al. . |
| 4,048,926 | 9/1977 | Brush, Jr. et al. . |
| 4,193,353 | 3/1980 | Hinton et al. .......................... 109/84 |
| 4,263,365 | 4/1981 | Burgess et al. . |
| 4,373,450 | 2/1983 | Miller et al. . |
| 4,413,869 | 11/1983 | Pichler et al. . |
| 4,541,545 | 9/1985 | Beattie et al. . |
| 4,569,294 | 2/1986 | Beattie et al. . |
| 4,574,454 | 3/1986 | Dyson . |
| 4,645,613 | 2/1987 | Harvey et al. . |
| 4,685,402 | 8/1987 | Nelson et al. . |
| 4,721,227 | 1/1988 | Hughes et al. . |
| 4,735,155 | 4/1988 | Johnson . |

FOREIGN PATENT DOCUMENTS 1365741 9/1974 United Kingdom .

*Primary Examiner*—Jimmy G. Foster
*Attorney, Agent, or Firm*—Eugene Stephens & Associates

[57] ABSTRACT

A fire-resistant case for protecting electronic storage media includes a main body and lid, each of which is assembled from a pair of subassemblies. The outer subassemblies of the lid and main body are made from an integral resin body having inner, outer, and intermediate shells for encasing a layer of water-bearing material. The outer shells form the outer skin of the case, the inner shells form a moisture-resistant layer, and the intermediate shells form an outer seal between the main body and lid. An inner subassembly of the main body is built up from an inner repository of heat-conducting material, slabs of phase-changing material, and a foam insulation that encases the inner respository and phase-changing material. The foam insulation is formed as a self-skinning foam for forming a part of an inner seal between the main body and lid. An inner subassembly of the lid is constructed in a variety of ways consistent with the purposes of the other named layers of the case.

39 Claims, 6 Drawing Sheets

MEDIA CASE

TECHNICAL FIELD

My invention relates to the field of fire-resistant enclosures and, in particular, to enclosures for protecting electronic storage media.

BACKGROUND

Computer disks and tapes and other media for storing electronically recorded information are especially vulnerable to damage by heat. In fact, temperatures well below the combustion temperature of paper may cause significant damage to electronic storage media. For example, computer disks are easily warped by heat, rendering them unreadable by computer disk drives. Electronic storage media also need to be protected against excessive humidity, which can cause similar damage.

Accordingly, fire-resistant enclosures of the kind normally used for protecting important papers do not meet the much more stringent requirements for protecting electronic storage media. Protection against the relatively small amounts of heat and humidity that can damage electronic storage media is provided by constructing fire-resistant enclosures for the media from several layers of specially selected materials. For example, U.S. Pat. No. 3,559,594 to Miller discloses a fire-resistant safe for protecting electronic storage media that includes: an inner repository made from a heat-conducting material, slabs of phase-changing material in contact with portions of the inner repository, a layer of heat-insulating material surrounding the inner repository and phase-change material, a layer of water-bearing material encasing the insulation, and an outer cabinet made of a metallic material enclosing the three layers that protect the inner repository. The safe of Miller may also include a sheet of moisture-resistant material forming a vapor barrier between the layer of water-bearing material and the layer of heat-insulating material. Together, the multiple layers of the Miller safe cooperate to protect storage media contained in the inner repository against excessive heat and humidity for a predetermined amount of time while the safe is subjected to an external temperature induced by fire.

U.S. Pat. No. 4,574,454 to Dyson discloses another fire-resistant enclosure for protecting electronic media that uses the same layers as Miller, but is intended to eliminate separate subassemblies which are said to be an apparent construction practice of earlier enclosure designs. Dyson complains that the practice of constructing the enclosures from separate subassemblies is time consuming and wasteful of material in the provision of separate casings for the subassemblies. The prior designs known to Dyson include a first subassembly that encases the water-bearing material between inner and outer steel skins. The presence of a steel casing intermediate the inner and outer skins is explained to aggravate a problem of heat "in-leak" from the exterior to the interior of the prior enclosures. Dyson proposes to solve these problems by eliminating the inner steel skin and building up all of the layers of protective material from the inside out, and this contrasts with Miller who builds up the same layers from outside in.

Nevertheless, both Dyson and Miller include the above-mentioned intermediate steel casings in the form of jambs for their respective doors. Dyson's enclosure also includes a wooden heat-break frame for insulating the inner repository from the steel door jamb. This practice of using a wooden frame to insulate against a steel door jamb is also apparent from a diskette safe disclosed by U.S. Pat. No. 4,373,450 to Miller et al. Although the wooden frames provide some protection against the direct conduction of heat between the steel door jambs and inner repositories of Dyson and Miller et al., the jambs conduct heat into the interior of their respective enclosures, thereby circumventing the important protections provided by the layer of water-bearing material.

SUMMARY OF THE INVENTION

My invention contrasts with recent teaching in the art by providing separate inner and outer subassemblies as a way of simplifying assembly of a fire-resistant enclosure for protecting electronic storage media. However, my fire-resistant enclosure also eliminates the problem of heat conduction through jambs into the interior of the enclosure.

The outer subassembly of my fire-resistant enclosure is preferably made of materials that do not readily conduct heat. For example, the outer subassembly may be formed from an integrally molded resin body having inner and outer shells separated by a cavity that is filled with water-bearing material. The outer shell of the resin body forms the outer skin of my fire-resistant enclosure, and the inner shell of the resin body forms a layer of moisture-resistant material that separates the water-bearing material from the interior of the case. Similarly molded resin bodies are used as outer subassemblies of both a main body and a cover of my enclosure. The inner and outer shells of the respective resin bodies join together forming respective jamb regions which provide an outer seal between the main body and cover.

Although it is known from several patents commonly owned herewith to use integrally molded resin bodies for forming inner, outer, and jamb surfaces of conventional fire-resistant enclosures, the resin bodies used in my invention incorporate a number of features that hold particular advantages for fire-resistant enclosures that protect electronic storage media. For example, the integral resin bodies eliminate need for special shuttering to mold the water-bearing material within a multi-layered construction; the jamb regions do not promote the conduction of heat to interior layers of the enclosure; and the inner shell portion of the resin bodies also functions as a moisture-resistant layer for protecting the storage media against excessive humidity.

The inner subassembly of the main body includes the usual features of a heat-conducting inner repository, slabs of phase-changing material in contact with portions of the inner repository, and a heat-insulating material encapsulating phase-changing material and the inner repository. However, the heat-insulating material of my invention is also formed as a self-skinning foam that is shaped to fit within the outer subassembly and to form part of an inner seal (or gasket) between the main body and cover of the enclosure.

The inner and outer subassemblies of the main body are put together by inserting the inner subassembly within a cavity formed by the outer subassembly. An adhesive may be used to bond the self-skinning foam of the inner subassembly to the inner shell portion of the outer subassembly. However, the inner subassembly may be dimensioned to extend out of the cavity to offset the inner and outer seals of the enclosure. The offset prevents any heat leaking through the outer seal from coming into immediate contact with the inner seal between the main body and cover.

The inner subassembly of the cover can be constructed in a number of different ways. For example, interior to a layer of heat-insulating material, a slab of phase-changing material may be encapsulated between an inner layer of resin material (i.e., a moisture-resistant layer) and a outer layer of heat-conducting material. However, if the slab of phase-changing material is appropriately sized to substantially cover an open end of the inner repository, it is possible to replace the outer layer of heat-conducting material with another layer of resin material. It is also possible to eliminate the phase-changing material from the inner subassembly by positioning the layer of heat-conducting material in contact with the heat-conducting material of the inner repository In other words, the phase-changing material may be used as either a direct barrier against the ingress of heat to the inner repository or an indirect barrier that absorbs heat conducted to the phase-changing material from remote areas of the inner repository. A gasket may also be attached to the skin of the inner subassembly of the cover to complete the inner seal with the self-skinning foam of the main body. The inner subassembly is attached with screws or other means to the outer subassembly of the cover.

The prior art, which proposes to eliminate the heat-conducting inner skin of a subassembly encasing water-bearing material, leaves in place the heat-conducting jamb by which the heat is conducted into the interior of the known enclosures. Absent the heat-conducting jamb, the heat-conducting inner skin of the known subassemblies is not responsible for the undesirable conduction of heat. Moreover, an inner heat-conducting skin overlapping inner ends of the jambs may be used to provide an important function of dissipating any concentrations of heat that might enter the enclosure through the jambs.

Accordingly, my invention also provides for using heat-conducting shields attached to one or the other of the cover and main body to dissipate any concentrations of heat that penetrate the outer seal between the main body and cover. Preferably, the heat-conducting shields are located between the inner and outer subassemblies overlapping at least a hinged connection between the outer subassemblies. However, the heat-conducting shields may also be especially useful for dissipating any concentrations of heat which penetrate the jambs at corners of the enclosure.

DRAWINGS

DETAILED DESCRIPTION

Figure 1:
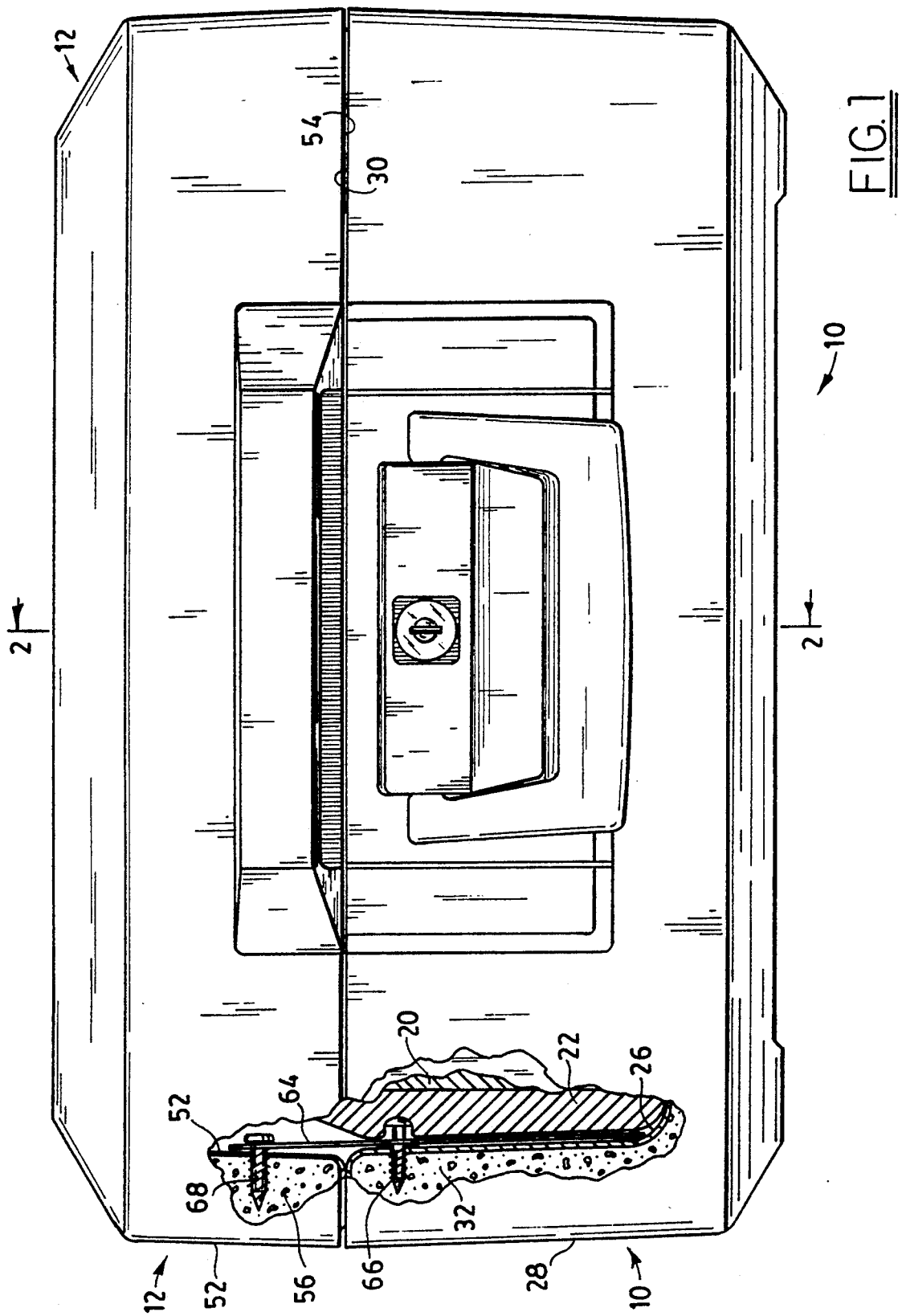
FIG. 1 is a front view of one embodiment of my invention appearing as a portable media case with a partly cut-away sectional view showing a lid support mechanism.
Figure 2:
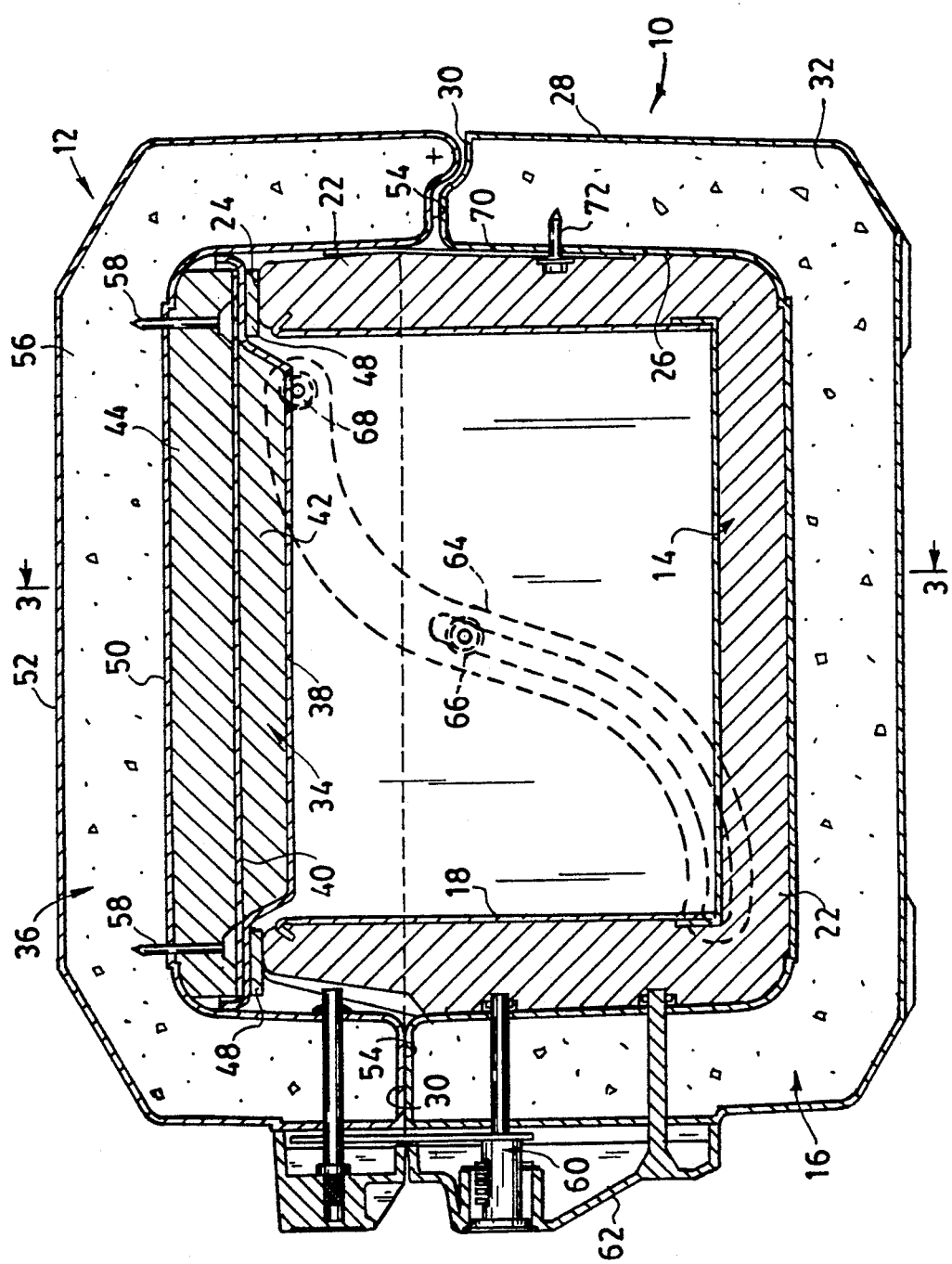
FIG. 2 is a cross-sectional end view showing a plurality of layers out of which the case is built.
Figure 3:
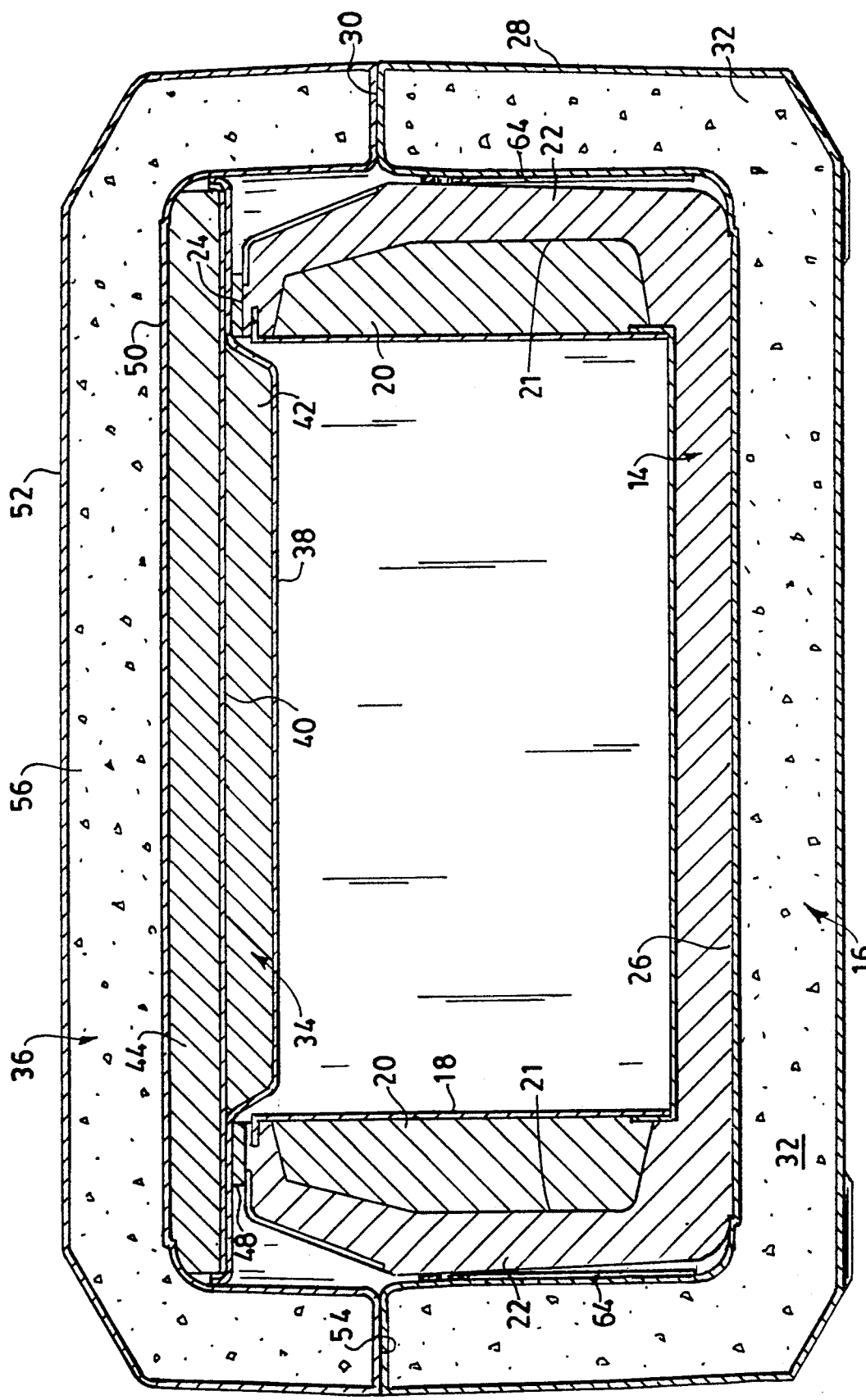
FIG. 3 is a cross-sectional side view taken from the same direction as FIG. 1 but showing the layered construction of the case.

A first embodiment of my invention in the form of a portable media case is illustrated by FIGS. 1 through 3. The case includes a main body 10 and lid 12, each of which is assembled from a pair of subassemblies.

For example, main body 10 includes an inner subassembly 14 and an outer subassembly 16. Within inner subassembly 14, an inner repository 18 for storing media articles is formed from a heat-conducting material such as sheet metal. Visible in FIGS. 1 and 3 are precast slabs of a phase-changing metal salt 20 within plastic liners or bags 21 that are positioned in contact with two sides of the inner repository 18. The slabs of metal salt 20 absorb heat energy conducted by the metal liner of the inner repository 18 up to the heat of fusion of the total mass of salt. Preferably, the salt is comprised of different size crystals having a range of melting points between approximately 35 to 45 degrees centigrade to maintain the inner repository at a safe temperature for storing the media articles. A suitable salt composition is disclosed in U.S. Pat. No. 4,645,613 of the present assignee.

Both the slabs of salt 20 and the remaining periphery of the inner repository 18 are encased within a layer 22 of self-skinning foam. The layer of foam 22 performs several functions. First, the foam provides a layer of thermal insulation for resisting the communication of heat to the inner repository 18. Second, the foam holds in place the slabs of salt 20 against the inner repository 18 in either a solid or liquid state. Third, the foam may be molded in a size and shape to fit within a cavity of the outer subassembly 16; and fourth, the self-skinning feature of the foam forms a compressible inner gasket 24 extending slightly beyond an open end of the inner repository for helping to seal the lid 12 to the main body 10.

The outer subassembly 16 of the main body 10 includes an integrally molded resin body made up of inner shell 26, outer shell 28, and intermediate shell 30. A hollow region defined between the inner and outer shells is filled with a layer of water-bearing material 32. U.S. Pat. No. 4,263,365, also belonging to the present assignee, discloses a suitable filling composed of a mixture of water, Portland cement, cellulose fibers, and a foaming agent. The cement mix absorbs heat energy to which the case is exposed according to the heat of vaporization of the mix which boils at substantially 100 degrees centigrade—the boiling point of water. In other words, the cement mix helps to maintain temperature within the outer subassembly 16 at approximately 100 degrees centigrade or less.

The inner shell 66 of the integrally molded resin body forms a moisture-resistant layer that acts as a vapor barrier for preventing water vapors released from the cement mix from entering the interior of the case. The outer shell 28 is molded with desired texturing for forming the outer skin of the main body 10. A jamb interconnecting the inner and outer shells 26 and 28 is formed by the intermediate shell 30. The jamb (also designated at 30) of the main body functions as part of an outer seal of the main body with lid 12.

The two subassemblies of main body 10 are put together by inserting inner subassembly 14 into a cavity defined within outer subassembly 16. However, the foam layer 22 of the inner subassembly is dimensioned to form a tight fit within the outer subassembly. Any common adhesive such as double-sided tape can be used to bond the two subassemblies together. In addition, both the foam layer 22 and the inner repository 18 are dimensioned to extend well out of the cavity formed by the outer subassembly so that compressible seal 24 is significantly offset from the jamb 30 of the outer subassembly. The offset prevents any heat leaking through the outer seal at jamb 30 of the outer subassembly from coming into immediate contact with the inner foam seal (or gasket) 24 of the inner subassembly.

The lid 12 is similarly constructed from separate subassemblies, namely, inner subassembly 34 and outer subassembly 36. The inner subassembly 34 includes a molded resin liner 38 which forms, together with a metal liner 40, a pocket for encapsulating a slab of phase-changing material 42. The phase-changing material may be made of the same metal salts that comprise the above-mentioned slabs 20 in the main body of the case and may be placed in the same type of liner or bag to further protect against leakage. Although the metal liner 40 is located above the slab 42 with respect to the intended orientation of the case, the different melting points of the metal salts maintain at least a portion of the salts in contact with the metal liner 40 throughout the melting process of the salts.

Inner subassembly 34 of lid 12 also includes a layer of foam insulation 44 affixed to the metal liner 40 and a gasket 48 affixed adjacent to the perimeter of the resin liner 38. The gasket 48 may be made from a conventional rubber-like material. Also, the gasket 48, together with the foam seal 24 of the main body, completes an inner seal between the inner subassemblies 14 and 34 of the main body and lid, respectively.

The outer subassembly 36 of the lid is formed similar to the outer subassembly 16 of the main body. That is, an integral resin body having an inner shell 50, an outer shell 52, and an intermediate shell 54 forms a permanent shuttering for containing a layer of water-bearing material 56. The same cement mix recommended for the above-described layer of water-bearing material 32 may be used. Also in common with the outer subassembly 16, the inner shell 50 forms a moisture-resistant layer, the outer shell 52 forms a outer skin of the case (i.e., lid), and the intermediate layer 54 forms a jamb. However, the jamb of intermediate layer 54 is shaped complementary to the jamb of above-described intermediate layer 30 of outer subassembly 16 to complete the outer seal between the main body and lid.

The inner and outer subassemblies of the lid are put together by fitting the inner subassembly within a cavity formed by the outer subassembly and inserting screws 58 through the inner subassembly into the concrete mix of the outer subassembly. Of course, a variety of other fastening means could be used as well. The outer subassembly of the lid also projects beyond the inner subassembly by the same amount that the inner subassembly of the main body projects beyond the outer subassembly of that same body to provide the desired offset between the inner and outer seals of the case.

Conventional means, not specifically illustrated, may be used to hinge the lid to the main body. A latching mechanism designated generally at 60 is mounted behind escutcheon 62 for holding the lid and cover tightly together. A lid support 64, attached to both the main body and lid by screws 66 and 68, respectively, may be used to hold the lid 12 in an open position for inserting or removing articles from the inner repository 18.

A heat-conducting shield 70 is attached to the outer subassembly 16 of the main body by screws 72. However, the heat-conducting shield 70 overlaps the respective jambs 30 and 54 between the two outer subassemblies 16 and 36. Although visible in FIG. 2 along just the above-mentioned hinge region of the enclosure, the heat-conducting shield may also extend around the corners of the enclosure between the outer subassemblies. Any heat that penetrates more vulnerable portions the outer seal between the outer subassemblies is dissipated by the heat-conducting shield so that the foam insulation of the inner subassemblies is not subjected to excessive concentrations of heat.

Figure 4:
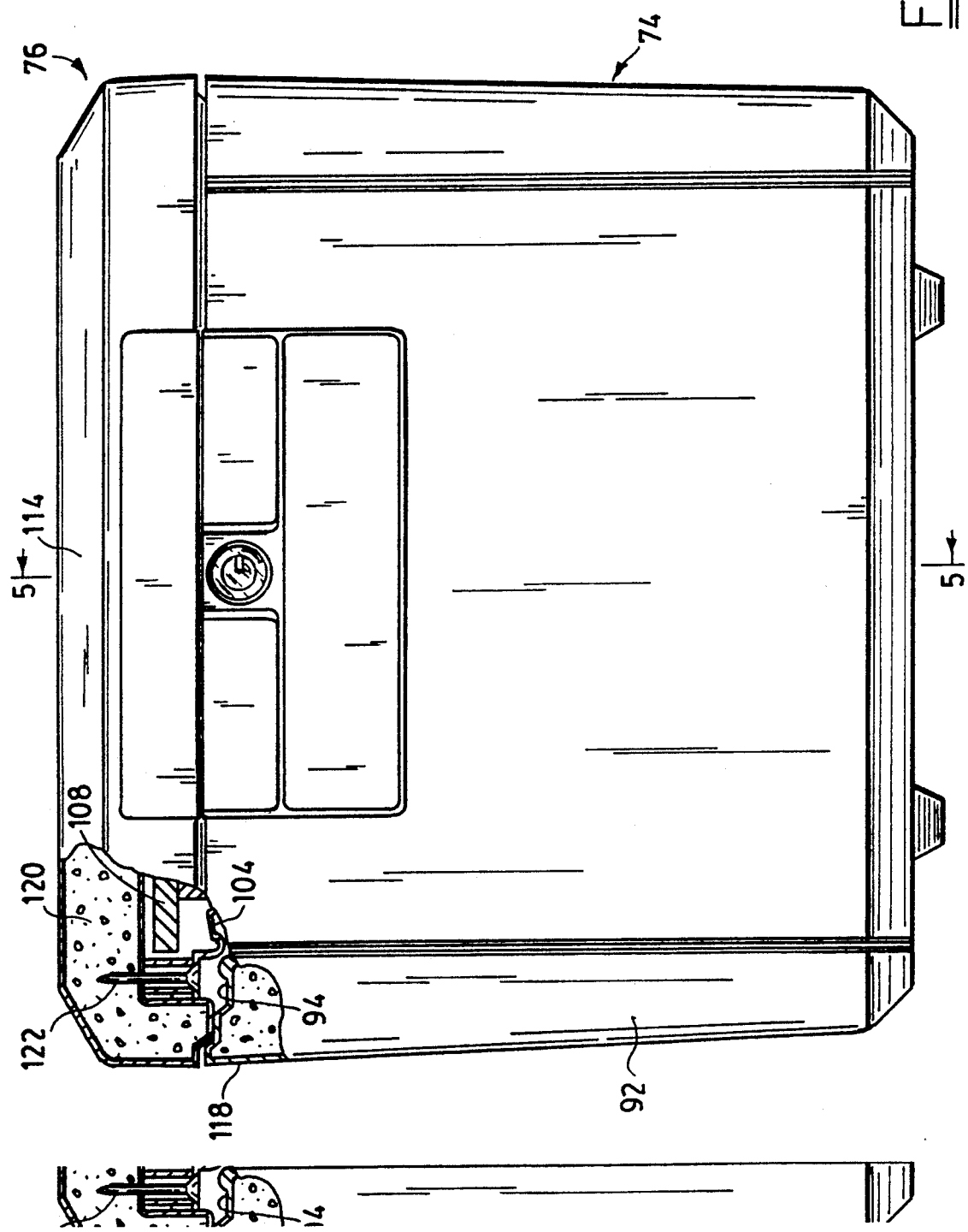
FIG. 4 is a front view of an alternative embodiment of my invention showing a media case having a different shape and a different arrangement of layers from which the case is constructed.
Figure 5:
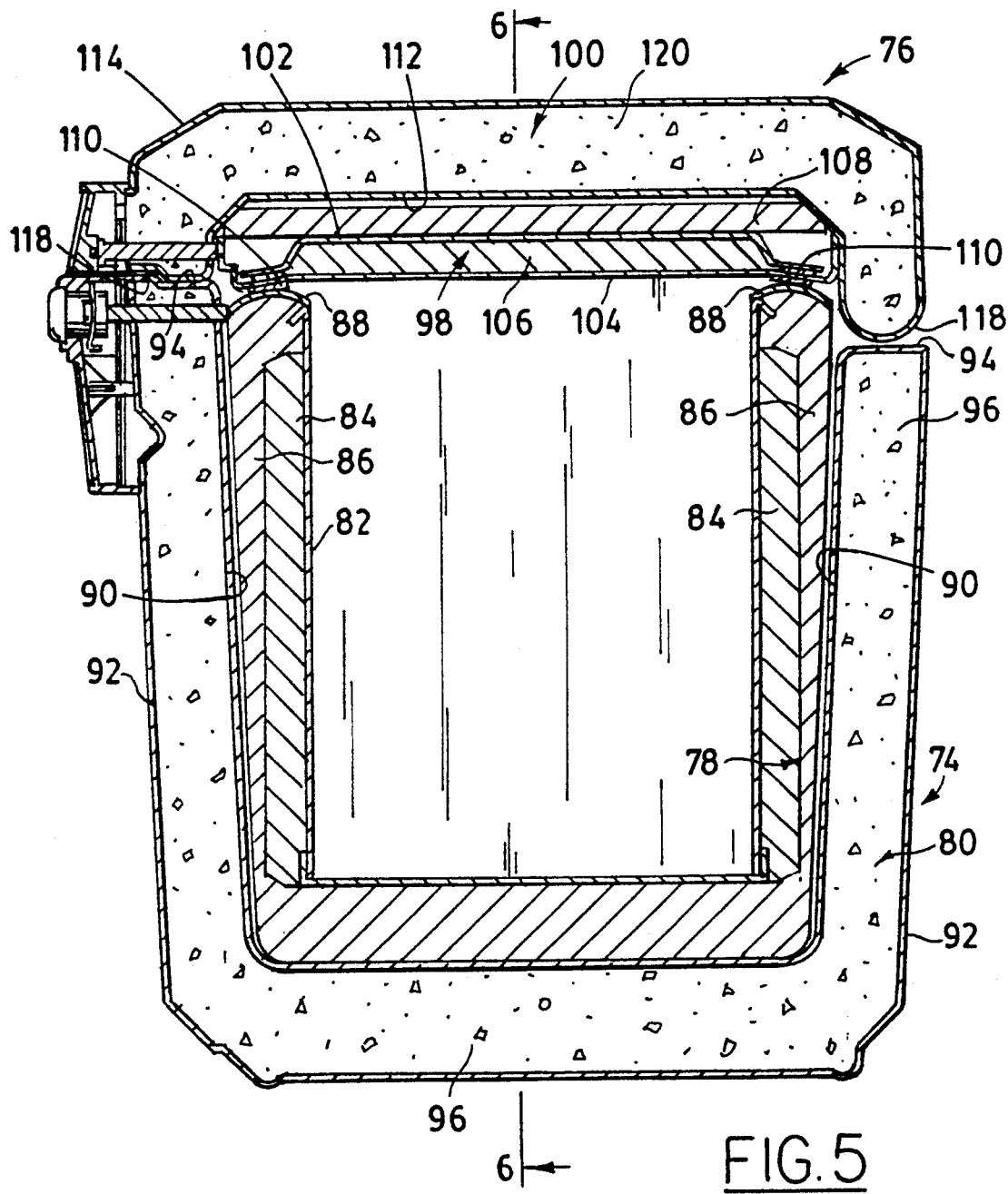
FIG. 5 is a cross-sectional end view of the alternative case showing the particular layers of its construction.
Figure 6:
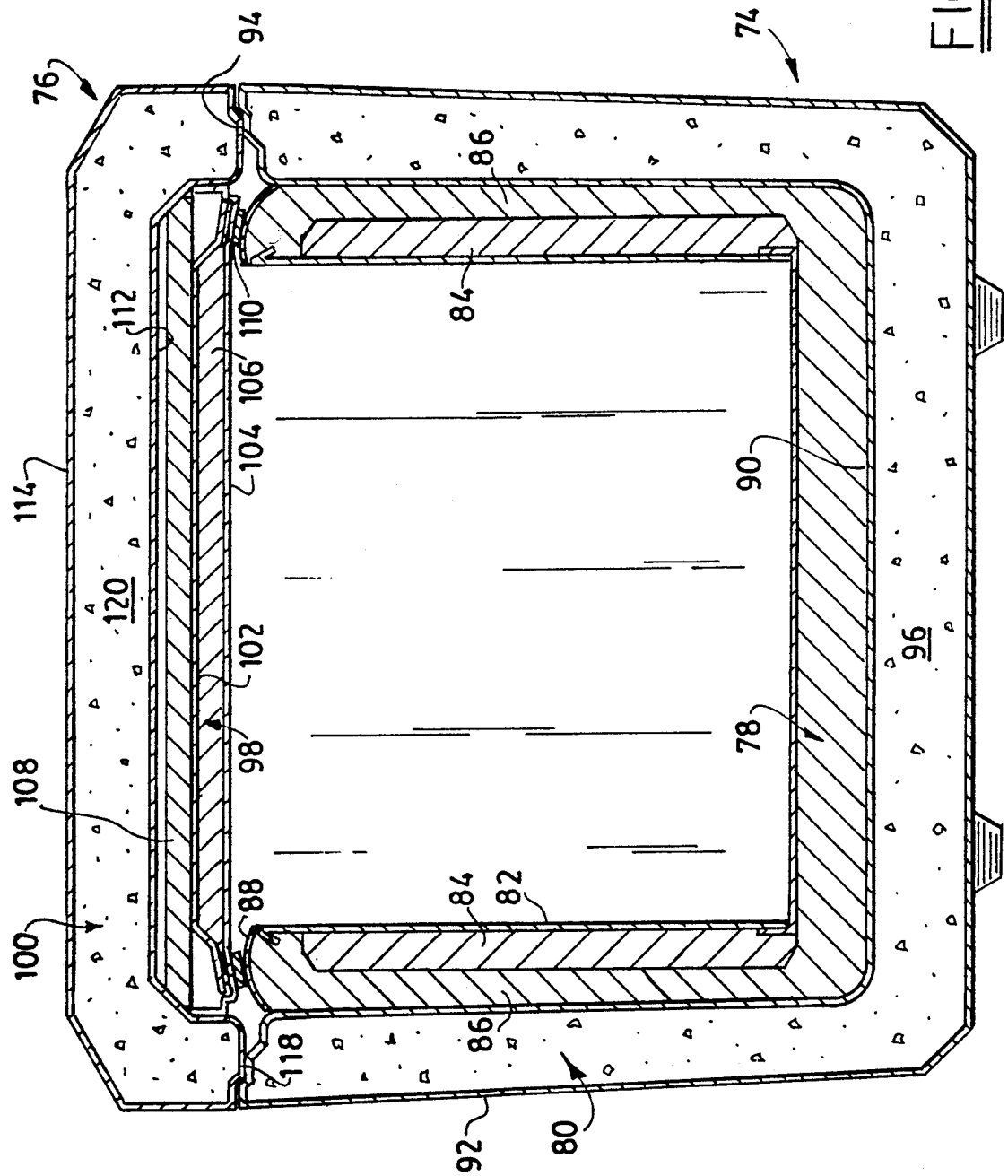
FIG. 6 is a cross-sectional side view taken in the direction of FIG. 4 but showing other features of the layered construction of the case.

Another embodiment of my invention is shown in FIGS. 4-6. The embodiment has many features in common with the previously described embodiment including a main body 74 and lid 76 that are constructed from separate subassemblies. For example, main body 74 includes an inner subassembly 78 and an outer subassembly 80. The inner subassembly 78 also includes the corresponding features of a heat-conducting inner repository 82, a layer of phase-changing salt 84, and a layer of self-skinning foam insulation 86. A compressible inner seal 88 is formed by the self-skinning foam about an open end of the inner repository 82.

The outer subassembly 80 of main body 74 includes an integral resin body made up of an inner shell 90, outer shell 92, and intermediate shell 94. The shells define between them a hollow region that is filled with a water-bearing cement mix 96. Inner shell 90 forms a moisture-resistant layer against the cement mix, outer shell 92 forms the outer skin of the body, and intermediate shell 94 forms a jamb region.

The inner and outer subassemblies of main body 74 are put together by inserting inner subassembly 78 within a cavity defined within outer subassembly 80. However, in contrast to the preceding embodiment, only a portion of the inner subassembly extends out of the cavity. In particular, the inner subassembly 78 only projects out of the outer subassembly along a portion of the jamb 94 that is used as a hinge between main body 74 and lid 76. The embodiment also differs by positioning layers of phase-changing material 84 around all sides of the main body.

The lid 76 is constructed from inner subassembly 98 and outer subassembly 100. The inner subassembly 98 includes two liners 102 and 104 encasing a layer 106 of phase-changing metal salt. However, both of the liners 102 and 104 are made from a resin material and form a shuttering for precasting the salt between them. The two liners 102 and 104 may be joined by thermal or solvent bonding or by some other known form of adhesive. A layer of foam insulation 108 is positioned against the resin liner 102, and a gasket 110 is affixed adjacent to the periphery of the liner 104. The gasket 110 completes the inner seal of the enclosure with the compressible inner seal 88 of the main body.

The outer subassembly 100 of the lid is also formed from an integral resin body defined by inner shell 112, outer shell 114, and intermediate shell 118, all of which provide for encasing a layer 120 of water-bearing material. The three shells perform the same respective functions as their counterparts in the outer subassembly 80 of the main body. Also, a cavity is defined within the inner shell 112 for receiving the inner subassembly 98 of the lid, and screws 122 are used to attach the inner and outer subassemblies of the lid together.

Although not specifically referenced by numeral, it can be seen from FIGS. 4 through 6 that the illustrated enclosure also includes a conventional hinged connection between the main body 74 and lid 76, as well as a conventional latching mechanism mounted behind an escutcheon. However, not shown are heat-conducting shields that may also be used to provide advantages similar to those described for the preceding embodiment. Also, the self-skinning foam of either embodiment can be textured, embossed, or colored to enhance the appearance of the interior of the cases.

Finally, although the invention has been described in reference to top-opening safes having lids, the invention can also be practiced with a variety of other types of enclosures including front-opening safes and files. The main body of the front-opening safes or files would be formed similar to the main bodies of the described embodiments, and respective doors or drawer heads would be formed similar to the described lids.

We claim:

1. In a fire-resistant enclosure for protecting temperature sensitive articles in which a body of the enclosure includes: an inner repository made of a heat-conducting material for containing the temperature sensitive articles; slabs made of a phase-changing material positioned adjacent to outer surfaces of said inner repository; a layer made of a heat-insulating material encasing said inner repository and said slabs of phase-changing material; a layer made of a moisture-resistant material encasing said layer of heat-insulating material; a layer made of a water-bearing material encasing said layer of moisture-resistant material; and an outer skin of said enclosure body encasing said layer of water-bearing material; the improvement in which:

said layer of moisture-resistant material and said outer skin of the enclosure body are molded from an integral resin body having inner and outer shells separated by a space that is filled with said water-bearing material; said inner shell of the resin body forming said layer of moisture-resistant material; said filled space of the resin body forming said layer of water-bearing material; and said outer shell of the resin body forming said outer skin of the enclosure body.

2. The fire-resistant enclosure of claim 1 in which said layer of heat-insulating material comprises a self-skinning foam that is molded around said inner repository and said slabs of phase-changing material to hold said slabs of phase-changing material in place against said inner repository.

3. The fire-resistant enclosure of claim 2 in which said self-skinning foam is molded in a form that may be inserted into a cavity formed by said inner shell of the resin body.

4. The fire-resistant enclosure of claim 3 in which a cover for said enclosure body includes: a second integrally molded resin body having inner and outer shells separated by a space that is filled with water-bearing material; said inner shell of the second resin body forming another layer of moisture-resistant material; said filled space of the second resin body forming another layer of water-bearing material; and said outer shell of the second resin body forming an outer skin of said cover.

5. The fire-resistant enclosure of claim 4 in which said self-skinning foam is molded in a form that extends beyond an open end of said inner repository forming a compressible foam gasket as part of an inner seal between said main body and said cover.

6. The fire-resistant enclosure of claim 5 in which both of said integral resin bodies include intermediate portions that form respective jambs between the cover and main body.

7. The fire-resistant enclosure of claim 6 in which said respective jambs are shaped complementary to each other for providing an outer seal between said main body and cover.

8. The fire-resistant enclosure of claim 7 in which said self-skinning foam and said inner repository are dimensioned to extend out of said cavity formed by said inner shell of the main body to provide an offset between said inner and outer seals of said main body and cover.

9. The fire-resistant enclosure of claim 4 in which said cover also includes a liner of resin material, a liner made of heat-conducting material, and another slab made of phase-changing material encapsulated between said two liners.

10. The fire-resistant enclosure of claim 9 in which a gasket is mounted adjacent to the perimeter of said resin liner and in alignment with said compressible foam gasket for completing said inner seal of said main body and cover.

11. The fire-resistant enclosure of claim 6 in which a heat-conducting shield overlaps said respective jambs within said main body and cover for dissipating concentrations of heat penetrating said outer seal.

12. The fire-resistant enclosure of claim 11 in which said heat-conducting shield is located between said two resin bodies and said self-skinning foam and covers at least a portion of said jambs along which said cover and said main body are hinged together.

13. The fire-resistant enclosure of claim 12 in which said heat-conducting shield also covers portions of said jambs along corners of the enclosure.

14. A heat and moisture resistant enclosure for protecting electronic storage media comprising:

a main body of the enclosure formed in part by a first integrally molded body made of resin material having inner and outer shells separated by a space that is filled with a water-bearing material;

a cover for said main body of the enclosure formed in part by a second integrally molded body made of resin material having inner and outer shells separated by a space that is filled with a water-bearing material;

integrally molded jambs between said inner and outer shells of each of said first and second bodies for forming an outer seal between said main body and said cover;

said main body also being formed by an inner repository made of a heat-conducting material, a slab made of a phase-changing material positioned adjacent to said inner repository, and a layer made of a self-skinning foam molded about said inner repository and said slabs of phase-changing material; and said layer of self-skinning foam being molded in a form that may be inserted into a cavity formed within said inner shell of said first integrally molded body and that extends beyond an open end of said inner repository forming part of an inner seal between said main body and said cover.

15. The enclosure of claim 14 in which said inner shells of both of said integrally molded bodies form respective layers of a moisture-resistant material for resisting moisture released by said water-bearing material from entering said inner repository.

16. The enclosure of claim 14 in which said self-skinning foam and said inner repository are dimensioned to extend out of said cavity formed by said inner shell of the main body to provide a deeper repository within which to store the electronic storage media and to provide an offset between said inner and outer seals of said main body and cover.

17. The enclosure of claim 16 in which said self-skinning foam is molded around said inner repository and said slab of phase-changing material to hold said slabs of phase-changing material in place against outer surfaces of said inner repository during a change in phase of said phase-changing material from solid to liquid.

18. The enclosure of claim 14 in which a heat-conducting shield overlaps said respective jambs of the two resin bodies within said main body and cover for dissipating concentrations of heat penetrating said outer seal.

19. The enclosure of claim 18 in which said heat-conducting shield is located between said two resin bodies and said self-skinning foam and covers at least a portion of said jambs along which said cover and said main body are hinged together.

20. The enclosure of claim 19 in which said heat-conducting shield also covers portions of said jambs along corners of the enclosure.

21. The enclosure of claim 14 in which said cover includes a layer of heat-insulating material attached to said inner shell of the second resin body.

22. The enclosure of claim 21 in which said cover also includes two liners for encapsulating within said cover another slab of phase-changing material.

23. The enclosure of claim 22 in which at least one of said liners is made of a moisture-resistant material.

24. The enclosure of claim 23 in which the other of said liners is made of a heat-conducting material.

25. The enclosure of claim 22 in which both of said liners are molded of a resin material.

26. The enclosure of claim 22 in which a gasket for forming another part of said inner seal is attached to said liner made of a moisture-resistant material.

27. A method of making a main body of a fire-resistant enclosure for protecting media comprising the steps of:
    molding an integral body of resin material in the form of inner and outer shells separated by a space;
    filling said space with a water-bearing material;
    fabricating an inner repository of a heat-conducting material;
    positioning slabs of phase-changing material adjacent to said inner repository;
    molding a layer of heat-insulating material around said inner repository and said slabs of phase-changing material; and
    inserting said layer of heat-insulating material together with said inner repository and said slabs of phase-changing material into a cavity formed within said inner shell of the integral body of resin material.

28. The method of making a main body of a fire-resistant enclosure as recited in claim 27 in which said step of molding said integral body includes forming a jamb between said inner and outer shells.

29. The method of making a main body of fire-resistant enclosure as recited in claim 28 in which said step of molding said layer of heat-insulating material includes forming a self-skinning foam that extends beyond an open end of said inner repository as a gasket for sealing a cover to the main body.

30. The method of making a main body of a fire-resistant enclosure as recited in claim 29 in which said self-skinning foam is molded in a form which extends out of said cavity formed within said inner shell of the integral body to offset said foam gasket with respect to said jamb.

31. A method of making a heat and moisture resistant enclosure for storing media comprising the steps of:
    molding a first integral body of resin material having inner and outer shells separated by a space;
    filling said space of a first integral body with a water-bearing material;
    fabricating an inner repository of a heat-conducting material;
    positioning slabs of phase-changing material adjacent to said inner repository;
    molding a layer of heat-insulating material around said inner repository and said slabs of phase-changing material;
    inserting said layer of heat-insulating material together with said inner repository and said slabs of phase-changing material into a cavity formed within said inner shell of the integral body;
    molding a second integral body of resin material having inner and outer shells separated by a space;
    filling said space of the second integral body with a water-bearing material; and
    respectively joining together said first and second integral bodies as a main body and a cover for the enclosure such that said outer shells of said integral bodies form outer skins of the enclosure.

32. The method of making an enclosure as recited in claim 31 in which said steps of molding integral bodies include molding jambs between said respective inner and outer shells for forming an outer seal between said main body and cover of the case.

33. The method of making an enclosure as recited in claim 32 in which said layer of heat-insulating material is molded in a form of a self-skinning foam that extends beyond an open end of said inner repository forming a gasket of an inner seal between said main body and cover of the case.

34. The method of making an enclosure as recited in claim 33 in which said self-skinning foam is molded in a form that extends out of said cavity formed within said inner shell of the first integral body to provide a deeper repository within which to store the media and to offset said inner seal with respect to said outer seal of the enclosure.

35. The method of making an enclosure as recited in claim 32 including the further step of positioning a heat-conducting shield overlaps said respective jambs of the two integral bodies within said main body and cover for dissipating concentrations of heat penetrating said outer seal.

36. The method of making an enclosure as recited in claim 35 including the further step of attaching said heat-conducting shield to said inner shell of the first integral body.

37. The method of making an enclosure as recited in claim 31 including the further step of sizing another layer of heat-insulating material to fit into a cavity formed within said inner shell of the second integral body.

38. The method of making an enclosure as recited in claim 37 including the further steps of:
  fabricating two liners encapsulating a slab of phase-changing material; and
  inserting said two liners encapsulating said slab of phase-changing material together with said another layer of heat-insulating material into said cavity formed within the inner shell of the second integral body.

39. The method of making an enclosure as recited in claim 38 wherein one of said liners is molded of a resin material and the other of said liners is made of a heat-conducting material.

* * * * *